United States Patent [19]
Moulu et al.

[11] Patent Number: 5,758,727
[45] Date of Patent: Jun. 2, 1998

[54] ENHANCED PETROLEUM FLUID RECOVERY METHOD IN AN UNDERGROUND RESERVOIR

[75] Inventors: Jean-Claude Moulu, Aubergenville; François Kalaydjian; Christian Deruyter, both of Rueil-Malmaison, all of France

[73] Assignee: Institut Francais du Petrole, Rueil Malmaison, France

[21] Appl. No.: 660,763

[22] Filed: Jun. 10, 1996

[30] Foreign Application Priority Data

Jun. 13, 1995 [FR] France .................. 95 07119

[51] Int. Cl.$^6$ .................................. E21B 43/25
[52] U.S. Cl. .................................................. 166/401
[58] Field of Search ........................ 166/400, 401, 166/305.1, 306

[56] References Cited

U.S. PATENT DOCUMENTS

| | | | |
|---|---|---|---|
| 2,267,548 | 12/1941 | Berl . | |
| 3,682,249 | 8/1972 | Fischer et al. | 166/400 X |
| 3,756,319 | 9/1973 | Holm et al. | 166/305.1 X |
| 3,817,331 | 6/1974 | Jones | 166/275 |
| 4,501,675 | 2/1985 | Malloy et al. | 252/8.55 D |
| 4,561,501 | 12/1985 | Shaw et al. | 166/273 |
| 4,676,316 | 6/1987 | Mitchell | 166/274 |
| 4,768,592 | 9/1988 | Perkins | 166/275 |
| 4,846,276 | 7/1989 | Haines | 166/401 |
| 4,856,589 | 8/1989 | Kuhlman et al. | 166/273 |
| 4,953,619 | 9/1990 | Dullien et al. | 166/265 |
| 5,247,993 | 9/1993 | Sarem et al. | 166/303 |

*Primary Examiner*—William P. Neuder
*Attorney, Agent, or Firm*—Antonelli, Terry, Stout & Kraus, LLP

[57] ABSTRACT

The method according to the invention is aimed at increasing the efficiency of the conventional enhanced petroleum fluid (O) recovery method (WAG) in an underground reservoir, according to which displacement is achieved towards production wells by means of alternate injections of water slugs (W) and of gas slugs (G) into one or more injection wells. It is characterized in that a substance (alcohol for example) allowing the spreading coefficient (S) to be made negative is added to one or more water slugs. The proportion to be added is selected as a function of the pressure and temperature conditions of the reservoir to be swept. The petroleum fluid to be displaced is distributed in the form of meniscuses that reduce the mobility of the gas and improve the sweep capacity thereof. The method allows to better control the input profile, and a greater and therefore more efficient injection pressure can be used. The method can be used in the field of enhanced oil recovery.

14 Claims, 2 Drawing Sheets

ENHANCED PETROLEUM FLUID RECOVERY METHOD IN AN UNDERGROUND RESERVOIR

FIELD OF THE INVENTION

The present invention relates to an enhanced petroleum fluid recovery method in an underground reservoir allowing to improve the sweep efficiency and more particularly the improvement of a recovery technique.

BACKGROUND OF THE INVENTION

Primary or secondary type recovery methods that are well-known to specialists can be used in order to better displace petroleum fluids towards production wells. The recovery is referred to as primary when the in-situ energy is used. The expansion of the fluids that are initially under high pressure in the reservoir allows part of the oil in place to be recovered. During this stage, the pressure in the reservoir can fall below the bubble point and a gas phase appears, that contributes to increasing the recovery ratio.

Secondary type recovery methods are rather used in order to avoid too great a pressure decrease in the reservoir. The principle consists in displacing the petroleum fluids by means of an energy supply external to the reservoir. Fluids are injected into the reservoir through one or more injection wells and the petroleum fluids displaced are recovered by means of production wells.

Water can be used as a displacement fluid but it has a limited efficiency. A large part of the oil remains in place notably because the viscosity thereof is often much higher than that of water. Besides, the oil often remains trapped by the constrictions of the pores due to the great interfacial tension between the oil and the water. Since the reservoir is often heterogeneous, the water readily sweeps the most permeable zones while bypassing the others, hence a great recovery loss.

It is also well-known to inject pressurized gas that penetrates the pores of the rock and displaces a large amount of the oil in place. Even if water has first been injected into the reservoir, as it is often the case, the gas has a well-known property of displacing an additional amount of oil that can be significant.

A notable drawback of this recovery technique using gas is that the latter is much less viscous than the oil to be displaced and than the water possibly in place. Because of the high mobility thereof, the gas flows through the reservoir by following only some most permeable channels that reach the production well/wells without displacing a large amount of oil.

If the reservoir is not homogeneous and comprises layers or cores of different permeability, this effect becomes still more pronounced and the gas, bypassing the least permeable zones, reaches the production wells even faster. When the gas thus breaks through prematurely without having the expected displacement effect, it loses all of its efficiency. To continue injecting it thus has no more practical effect.

It is also well-known to combine the two techniques according to a method referred to as WAG method. Water and gas are successively injected and this sequence is repeated by alternating the water slugs and the gas slugs as long as oil is produced under good economic conditions. This combined injection method produces better results since the mobility of the gas of each slug, the latter being more efficient than water at the level of the pores, is relatively reduced by the presence of the water slug preceding it. However, as a result of the reduced volume of the slugs in relation to the distance they must cover and of the heterogeneity of the reservoir, the efficiency of the macroscopic sweep does not last long.

It is also well-known to improve the efficiency of these combined injections by adding surfactants to the water, that reduce the water-oil interfacial tension.

The foam that forms in the presence of the gas has the effect of reducing the mobility of the gas and the fingerings.

Thickeners can also be added to the water in order to increase the viscosity thereof, therefore its efficiency in relation to the oil, but in this case the mobility ratio of the water in relation to the gas is even more unfavourable.

Various techniques intended to improve the reservoir sweep efficiency are described for example in patents U.S. Pat. Nos. 4,768,592 or 3,817,331.

The method according to the invention allows petroleum fluids to be displaced in a reservoir by alternate injections of water slugs and of gas slugs, while reducing the drawbacks of the previous alternate slug displacement methods.

SUMMARY OF THE INVENTION

The method according to the present invention allows to displace petroleum fluids out of an underground reservoir by means of successive injections, through one or more injection wells, of slugs of a wetting fluid such as water, and of gas slugs, and to recover the petroleum fluids displaced by the wetting fluid and the gas injected by means of one or more production wells. It is characterized in that an amount of substances sufficient to make the spreading coefficient negative is added to at least one slug of the wetting liquid injected.

The method can be implemented by adding for example a certain amount of alcohol to the wetting liquid. As the case may be, according to the pressure and temperature conditions of the reservoir to be swept, the proportion of alcohol added to the wetting liquid can range for example from 1 to 5% by weight. An alcohol of low molecular weight, belonging to the isobutyl or isoamyl alcohol class, is for example selected.

The method can be implemented by adding for example to the wetting liquid a substance capable of lowering the interfacial tension between the liquid and the gas, selected for example from the light polar compounds such as amines, fluorinated products or light acids.

By making the spreading coefficient negative, the petroleum fluid to be displaced separates more readily from the wetting liquid as described hereafter, and it can thus reduce the mobility of the gas. The input profile is then better controlled and a higher, therefore more efficient injection pressure can be used.

BRIEF DESCRIPTION OF THE DRAWINGS

Other features and advantages of the method according to the invention will be clear from reading the description hereafter of embodiments given by way of non limitative examples, with reference to the accompanying drawings in which.

DESCRIPTION OF THE INVENTION

Like the prior WAG sweeping methods, the method according to the invention comprises injecting successive slugs of a wetting liquid such as water and of gas into a formation containing oil.

The improvement proposed is based on a phenomenon existing on a microscopic scale in the pores of the porous medium constituting the reservoirs.

Figure 1:
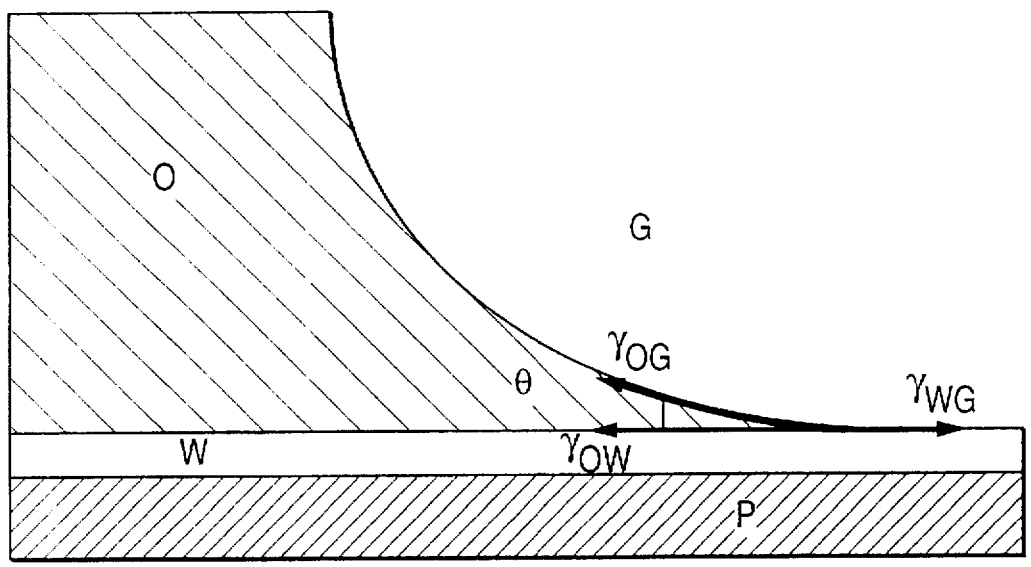
FIG. 1 diagrammatically shows an example of relative positioning of the interfaces between oil O, water W and gas G in contact with the wall of a pore, FIG. 2 diagrammatically shows how the oil spreads on the water wetting a wall of a pore within the scope of a conventional sweeping method using alternate water and gas slugs, FIG. 3 diagrammatically shows the effect produced on the oil, under the same sweep conditions, by the addition of substances aimed at separating the oil from the water film wetting the wall of the pore.

When water and gas slugs are successively injected into rocks containing oil, the two fluids injected are brought together in at least part of the pores. The form and the existence of the interfaces separating these fluids two by two (FIG. 1) are described by a quantity called spreading. The value of the spreading coefficient S that expresses the equilibrium between the various forces acting at the possible point of contact between the three fluids is expressed by the relation:

$S = y_{wg}(y_{wo} + y_{og})$, where $y_{wg}$ is the interfacial tension between the water and the gas, $y_{wo}$ is the interfacial tension between the water and the oil, and $y_{og}$ is the interfacial tension between the oil and the gas.

When the behaviour of three fluids: water, oil and gas simultaneously present in a capillary (wettable by water) is studied, it is observed that the water forms a film on the walls and, if the spreading coefficient S is positive, the oil spreads on the water in the form of another film superposed on the first. In the central channel, the gas is free to circulate.

In the opposite case (S<0), it can be observed that the oil forms meniscuses across the capillary, dividing the gas into so many little pockets that are much less mobile than the continuous gas phase in the previous case and that can act more efficiently in order to force the oil out of the capillary.

The idea which the method according to the invention is based on consists in applying this property to the sweeping of an underground reservoir containing hydrocarbons in order to drive the oil out of the pores of the porous rocks.

It is implemented by performing alternate injections of a gas and of a liquid according to a method known in the art, but by using to that effect a wetting liquid (such as water for example) whose spreading coefficient is made sufficiently negative for the oil to take the form of droplets in the presence thereof.

By reducing the mobility of the gas on a microscopic scale, through the formation of a large amount of oil meniscuses, the circulation of the gas is stabilized and even blocked up to a certain pressure.

In order to make this spreading coefficient negative, alcohol is for example added in sufficient amounts. As the case may be, a proportion of alcohol of 1 to is 5% by weight is added to the water of the slugs injected.

An alcohol of low molecular weight, belonging to the isobutyl or isoamyl alcohol class for example, is preferably selected.

The proportion of alcohol is given here by way of non limitative example. However, the proportion added should not lower the water-oil interfacial tension too much to the point where the spreading coefficient is given back a positive value.

The substance to be added to the wetting liquid must also be selected as a function of its own salinity and, in some cases, the latter must even be adjusted in order to avoid incompatibilities with the water in place in the reservoir.

Figure 2:
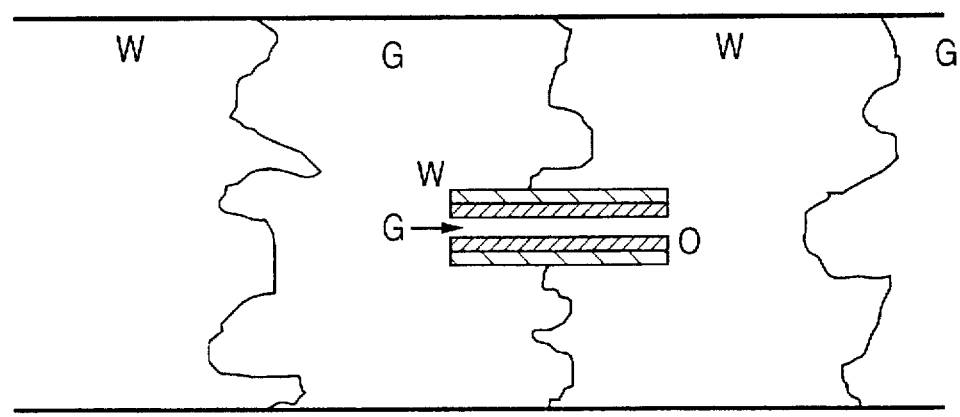

When the pores of a rock are crossed through by alternating water W and gas G slugs, according to the conventional method, the wetting fluid, water for example, forms a film that covers the walls P. The oil, on account of its positive spreading coefficient S, spreads and forms a film superposed on the first one (FIG. 2), while leaving the central part of the pore clear for the circulation of the gas G. The gas can thus readily penetrate and flow through the water slug that is more viscous. The advantage of the conventional WAG method as regards the stabilization of the gas is thus quickly lost.

Besides, as the gas circulates unrestrainedly, the local pressure thereof cannot be very high. Its saturation remaining low, a large proportion of oil remains in place. An injection pressure increase in order to increase the local pressure of the gas has generally only the effect of increasing the flow rate thereof without increasing its oil carrying capacity.

Figure 3:
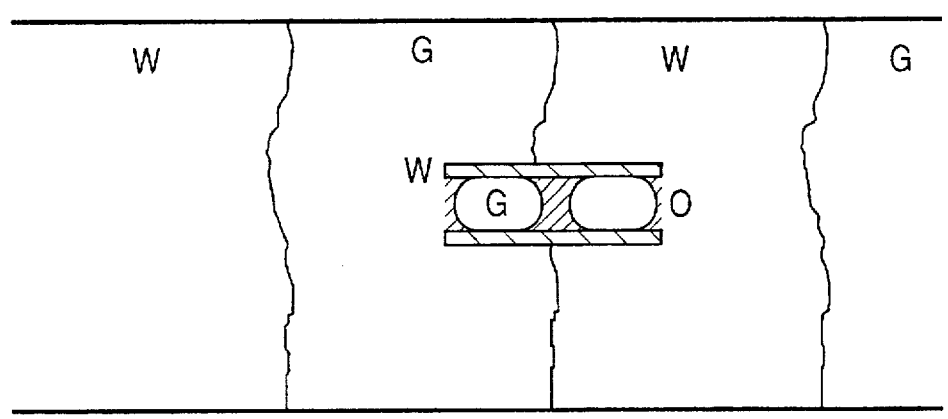

In the pore schematized in FIG. 3, on the contrary, the oil O is prevented from spreading by the substances added to the wetting fluid (water in this case) that make the spreading coefficient S sufficiently negative. It no longer spreads on the water film W as previously, but it remains separate therefrom, forming droplets in the form of meniscuses across the pore, that split the gas phase injected after the water slug.

The pores of a porous medium generally consist of a succession of convergent parts and of divergent parts. Therefore, the oil meniscuses pushed by the gas can be blocked by the constrictions of the pores when the capillary pressure is insufficient. In order to force the block, the pressure must be increased and, correlatively, a pressure applied to the whole can be maintained at a rather high level.

The pressure prevailing in the pores after the blocking thereof by an oil meniscus is given by Laplace's law $P = 2_{og}/r$ proportional to the interfacial tension between the oil and the $gas_{og}$ and inversely proportional to the constriction radius r. The total pressure that the zone swept can withstand is proportional to the number of these meniscuses and it can therefore be very high. It results therefrom that:

in relation to the conventional WAG sweeping method, for an identical injection pressure, the gas circulation is highly reduced on account of these is blocks in the pores. The penetration of the water by the gas injected is highly decreased and therefore the succession order of the fluids characteristic of the WAG method is not modified. The integrity is kept;

the blocking of the pores can be such that the injection pressure is not sufficient to displace the whole of the fluids. An injection pressure increase is then possible without increasing critically the velocity of flow of the gas. A high pressure can be maintained in each gas slug, hence a substantial increase in the gas saturation and a more efficient sweep of the oil in place.

EXPERIMENTAL COMPARATIVE EXAMPLES

Within the experimental scope defined hereafter, two alternate injections of water and of gas slugs were achieved in a porous medium by means of the conventional WAG sweeping method and of the method according to the invention.

The porous medium was a bar of Vosges sandstone of length: 40.5 cm, of section: 12 cm$^2$, of permeability: 2 Darcy, and of porosity: 19.7%.

The oil had the following characteristics: a viscosity of 2.1 cp (2.1 mPa.s), a surface tension of 25.8 mN/m; the gas was nitrogen.

A brine with a viscosity of 1.08 (mPa.s), a surface tension of 71.5 mN/m and a spreading coefficient S=5.5 was used for the first test.

For the second test, the brine modified by adding alcohol had a spreading coefficient S=−4.1, a viscosity of 1.08 (mPa.s) and a surface tension of 43.8 mN/m.

A) Experimental description
1) Preliminary setting of the fluids by means of the following stages:
   a) initial brine saturation;
   b) displacement of the brine by the oil;
   c) change to residual oil by brine injection.
   Phase balance: 27.7% of oil, 3% of gas, 69.3% of brine.
2) Then, for a spreading coefficient S=5.5 and S=−4.1, the following stages are carried out:
   a) alternate injection of 5 gas slugs (10 cm$^3$) at low pressure—60 mB (−6 kPa) and of 5 brine slugs (20 cm$^3$) with a pump having a flow rate of 10 cm$^3$ per hour, i.e. 1.5 VP of fluid in total, and
   b) recovery of the effluents, as a function of time, by means of positive-displacement meters, the pressure being measured by means of pressure detectors.

B) Results

| Brine slugs | 1 | 2 | 3 | 4 | 5 |
|---|---|---|---|---|---|
| | S = 5.5 | | | | |
| Injection end pressure in kPa | 25.8 | 29.5 | 29.5 | 29.1 | 29.5 |
| Oil/oil in place recovery % | 1.48 | 3.7 | 6.6 | 10.3 | 12.2 |
| | S = 4.1 | | | | |
| Injection end pressure in kPa | 26.4 | 32.9 | 40.0 | 43.3 | 43.5 |
| Oil/oil in place recovery % | 0.4 | 5 | 11.6 | 15 | 15.8 |

Figure 4:
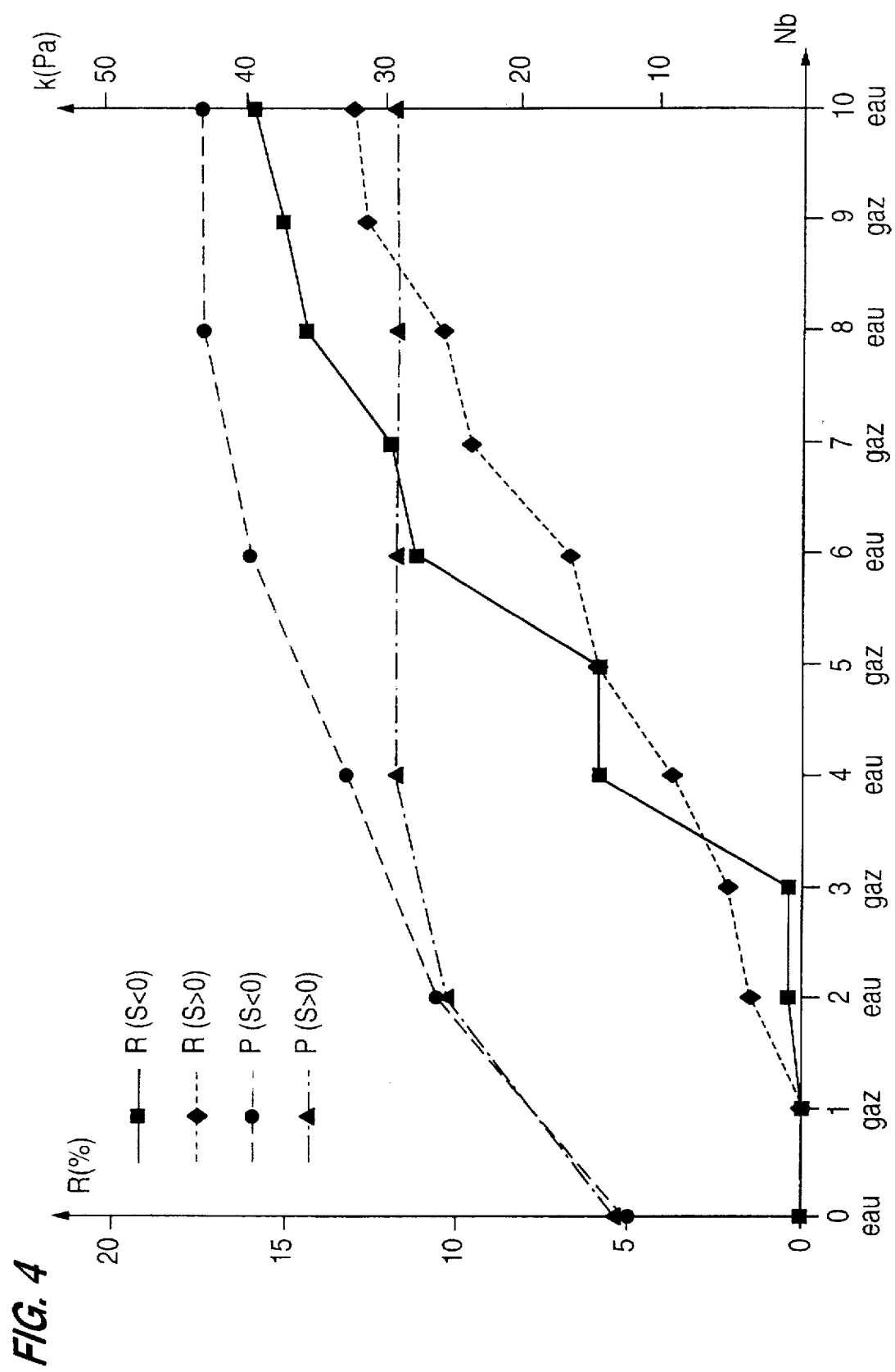
FIG. 4 shows the compared evolutions of the percentage of petroleum fluids recovered by means of the conventional method and of the method according to the invention.

It can be seen in FIG. 4 and in the table above that, for a negative spreading coefficient S, the injection pressure of water is higher than when it is positive (43.5 kPa instead of 29.5 kPa), which is explained by the fact that, as stated above, the oil forms meniscuses and a higher pressure is therefore required to make them flow through the constrictions of the pores. The oil circulating in the form of meniscuses is better displaced in the porous medium and recovery is improved when it flows out: 4% gain after the injection of five water slugs.

Other tests showed that the injection pressure of the gas should not be too high since the gas, by creating a channel, succeeds in achieving fingerings in the water slugs. The oil is recovered stepwise when S<0. There is no oil production when the first gas slugs are injected whereas, in the opposite case, production is continuous whatever the nature of the slug injected.

The method is applicable to other products placed in water, capable of lowering the interfacial tension between the water and the gas as a function of the pressure and temperature conditions of the reservoir to be swept. Many products having a good solubility in water and that are light polar compounds can be cited: amines, fluorinated products, light acids. The nature of the product used will also depend on the salinity of the water injected, which must be adjusted in some cases in order to avoid incompatibilities with the water in place in the reservoir.

We claim:

1. A method for displacing petroleum fluids out of an underground reservoir comprising: successively injecting, through at least one injection well, slugs of a wetting fluid and of gas slugs, recovering, through at least one production well, the petroleum fluids displaced by the wetting fluid and by the gas injected, and adding an amount of a substance to at least one slug of the wetting fluid injected sufficient to make a spreading coefficient (S) negative, the spreading coefficient (S) being defined as $S=y_{wg}-(y_{wo}+y_{og})$, where $y_{wg}$ is interfacial tension between the wetting fluid and the gas, $y_{wo}$ is interfacial tension between the wetting fluid and the oil, and $y_{og}$ is interfacial tension between the oil and the gas.

2. A method as claimed in claim 1, wherein the substance added to the wetting liquid is alcohol.

3. A method as claimed in claim 2, wherein the proportion of alcohol added to the wetting fluid ranges from 1 to 5% by weight, as a function of the pressure and temperature conditions of the reservoir to be swept.

4. A method as claimed in claim 1, wherein the substance is an isobutyl or isoamyl alcohol.

5. A method as claimed in claim 1, wherein substance lowers the interfacial tension between the wetting fluid and the gas.

6. A method as claimed in claim 1, wherein the substance is a light polar compound.

7. A method as claimed in claim 6, wherein the substance is selected from the group consisting of amines, fluorinated products and light acids.

8. A method as claimed in claim 1, wherein the wetting fluid is water.

9. A method as claimed in claim 2, wherein the wetting fluid is water.

10. A method as claimed in claim 3, wherein the wetting fluid is water.

11. A method as claimed in claim 4, wherein the wetting fluid is water.

12. A method as claimed in claim 5, wherein the wetting fluid is water.

13. A method as claimed in claim 6, wherein the wetting fluid is water.

14. A method as claimed in claim 7, wherein the wetting fluid is water.

* * * * *